United States Patent
Warnes (10) Patent No.: US 10,287,980 B2
(45) Date of Patent: May 14, 2019

(54) PARTICLE SEPARATING FLUID INTAKE

(71) Applicant: ROLLS-ROYCE plc, London (GB)

(72) Inventor: Gordon David Warnes, Portishead (GB)

(73) Assignee: ROLLS-ROYCE PLC, London (GB)

( * ) Notice: Subject to any disclaimer, the term of this patent is extended or adjusted under 35 U.S.C. 154(b) by 417 days.

(21) Appl. No.: 15/011,564

(22) Filed: Jan. 31, 2016

(65) Prior Publication Data

US 2016/0245177 A1 Aug. 25, 2016

(30) Foreign Application Priority Data

Feb. 25, 2015 (GB) .................................. 1503123.0

(51) Int. Cl.
*B01D 45/14* (2006.01)
*B64D 33/02* (2006.01)
(Continued)

(52) U.S. Cl.
CPC .............. *F02C 7/052* (2013.01); *B01D 45/14* (2013.01); *B64D 33/02* (2013.01); *F02C 7/055* (2013.01);
(Continued)

(58) Field of Classification Search
CPC .......... F02C 7/052; F02C 7/055; B64D 33/02; B64D 33/022; B64D 33/0246;
(Continued)

(56) References Cited

U.S. PATENT DOCUMENTS

| 3,302,395 A * | 2/1967 | Robbins ................... F02C 7/05 244/53 B |
| 3,402,881 A | 9/1968 | Moore et al. |

(Continued)

FOREIGN PATENT DOCUMENTS

| EP | 0 210 070 A2 | 1/1987 |
| FR | 2 588 311 A1 | 4/1987 |

(Continued)

OTHER PUBLICATIONS

Aug. 6, 2015 Search Report issued in British Application No. 1503123.0.

(Continued)

*Primary Examiner* — Ehud Gartenberg
*Assistant Examiner* — Stephanie Cheng
(74) *Attorney, Agent, or Firm* — Oliff PLC (57) ABSTRACT

A fluid intake including first and second ducts and a particle separation spinner defining an interface between the first and second ducts is disclosed. Spinner includes flow passages passing from first duct side of the spinner to second duct side of the spinner and splitter bodies separating the flow passages. Flow passages and splitter bodies are arranged in thread-like screw manner about spinner. In use, the spinner is spun about an axis of rotation, axis and direction of rotation being such that, from static frame of reference with respect to first duct, splitter bodies and flow passages have a component of movement towards a main travel direction of a fluid flow incident towards spinner from first duct. Splitter bodies are arranged such that they oblige fluid in the fluid flow to follow a convoluted path if it is to pass from first duct to second duct via the flow passages.

12 Claims, 3 Drawing Sheets

(51) Int. Cl.
*F02C 7/052* (2006.01)
*F02C 7/055* (2006.01)

(52) U.S. Cl.
CPC ............... *B64D 2033/0246* (2013.01); *F05D 2220/323* (2013.01); *F05D 2250/232* (2013.01); *F05D 2250/25* (2013.01); *F05D 2250/411* (2013.01); *F05D 2260/607* (2013.01); *Y02T 50/675* (2013.01)

(58) Field of Classification Search
CPC .......... B64D 2033/07; B64D 2033/052; B64D 2033/0246; F05D 2250/232; B01D 45/14; B01D 45/16; B01D 33/27; B01D 33/275
USPC .......... 55/306, 307, 308, 337, 345, 339, 520
See application file for complete search history.

(56) References Cited

U.S. PATENT DOCUMENTS

| | | | | |
|---|---|---|---|---|
| 4,179,273 A | * | 12/1979 | Montusi | B01D 45/16 210/512.1 |
| 4,255,174 A | * | 3/1981 | Simpson | B01D 45/16 55/306 |
| 5,755,096 A | | 5/1998 | Holleyman | |
| 6,499,285 B1 | * | 12/2002 | Snyder | B64D 33/02 244/53 B |
| 6,872,232 B1 | | 3/2005 | Pavlatos | |
| 2009/0101013 A1 | * | 4/2009 | Moredock | B01D 45/16 95/269 |

FOREIGN PATENT DOCUMENTS

| | | |
|---|---|---|
| WO | 84/02747 A1 | 7/1984 |
| WO | 02/29224 A1 | 4/2002 |

OTHER PUBLICATIONS

Jul. 19, 2016 Search Report issued in European Patent Application No. 16152862.

* cited by examiner

PARTICLE SEPARATING FLUID INTAKE

The present disclosure concerns fluid intakes and more specifically fluid intakes having particle separators. The disclosure has application in the field of gas turbine engine gas intakes, be they aero (e.g. helicopters), marine, energy generation (e.g. industrial gas turbine) or land vehicle (e.g. a fighting vehicle). The disclosure may however also have application in alternative fields such as vacuum cleaners, liquid filtering and industrial processing plants.

For simplicity the following background to the disclosure is described with reference to gas turbine engines. This is not however intended to be limiting.

Gas turbine engines typically use ambient air as a working fluid. Ambient air is however contaminated with particles (e.g. sand, dust, water droplets, ice and other small foreign objects). Such particles can have a deleterious effect on turbomachinery of the gas turbine engine (e.g. erosion of blades, fouling of cooling holes and accretion on surfaces). Consequently gas turbine engines required to operate in adverse environmental conditions (e.g. helicopters in deserts) may be fitted with engine air inlet Inertial Particle Separators (IPS).

Typical IPSs remove particles entering an inlet duct of the gas turbine engine before they reach the turbomachinery. Separation of particles from the air flow is achieved via two mechanisms, one for separation of smaller particles and one for separation of larger particles. Smaller particles are those having a lower Stokes number (i.e. their inertia is small in comparison to the drag on the particle caused by a surrounding fluid). Larger particles have larger Stokes number and their trajectories tend to be substantially unaffected by a surrounding fluid over a relevant distance. As will be appreciated particles having lower Stokes numbers than other particles need not necessarily be physically smaller than particles having larger Stokes numbers. Nonetheless for typical particles having substantially constant density, particles with a lower Stokes number will be smaller; hence use of the industry recognised smaller and larger terminology.

In order that smaller particles in a gas flow are separated, the flow is forced to follow a convoluted path as dictated by the shape of the intake duct. Further the momentum of the smaller particles is increased by a local acceleration of the fluid caused by a reduction in the area of the intake duct. The increase in the momentum of the particles may be sufficient such that rather than following the convoluted path of the flow stream, they separate and continue on an alternative path into a scavenge duct provided. A substantially 'U' shaped convolution is typical, with an inlet to the scavenge duct being provided at a radially outer wall of the intake duct and substantially at an interface between a turn and return branch of the 'U' shape. In this way particles failing to 'make the turn' may continue into the scavenge duct.

A second mechanism is provided for the separation of larger particles assumed to follow substantially ballistic trajectories regardless of gas flow direction. The intake duct is shaped to encourage such particles to bounce (usually twice) on its walls along ballistic trajectories that will take them into the scavenge duct.

As will be appreciated both mechanisms place constraints on the shape and dimensions of the intake duct walls. Further the decrease in intake duct area with a view to increasing the momentum of smaller particles tends to increase the likelihood of larger particles bouncing past the scavenge duct and towards the turbomachinery. Consequently geometric design enhancements directed at improving small particle separation (and particularly the separation of ever smaller particles) are constrained by the need to effectively separate larger particles.

Further secondary disadvantages with IPSs as described include the need for a separate pump to drive gas extraction and separated particles from the scavenge duct (with inherent additional complexity) as well as difficulties in delivering anti-icing bleed air to portions of the intake duct due to its geometric complexity.

According to an aspect of the invention there is provided a fluid intake comprising optionally a first duct, optionally a second duct and optionally a particle separation spinner optionally defining an interface between the first duct and the second duct, the spinner comprising optionally flow passages passing from a first duct side of the spinner to a second duct side of the spinner and optionally splitter bodies separating the flow passages, optionally the flow passages and optionally the splitter bodies being arranged in a thread-like screw manner about the spinner and where further, in use, the spinner is optionally spun about an axis of rotation, optionally the axis and direction of rotation being such that, from a static frame of reference with respect to the first duct, the splitter bodies and flow passages have a component of movement towards a main travel direction of a fluid flow incident towards the spinner from the first duct, the splitter bodies optionally being arranged such that they oblige fluid in the fluid flow to follow a convoluted path if it is to pass from the first duct to the second duct via the flow passages.

By effectively continuously moving the splitter bodies and flow passages towards the oncoming fluid flow (i.e. towards the main travel direction which is generally from the first duct towards the second), the velocity of small particles in the fluid flow can be increased relative to them. This increases the relative momentum of the small particles, making it more likely that they are separated from the fluid flow as it travels in a convoluted manner over the splitter bodies and through the flow passages. This increase in small particle momentum and consequent improvement in separation efficiency may be achieved without placing constraints on the area and shaping of the first duct. A designer may therefore have increased freedom in selecting first duct area and shaping (particularly the shaping of a radially outer wall of the first duct) in order to reduce or prevent larger particles, tending to follow ballistic trajectories, from passing into the second duct.

As will be appreciated the splitter bodies may all form part of a single thread (single start), with the passages separating adjacent turns of the thread. In this circumstance the passages may all form part of a single threaded opening. Alternatively the splitter bodies may be distributed among multiple threads (multi-start) with the passages separating adjacent turns which nonetheless form part of different threads. In this circumstance the passages may be distributed among multiple threaded openings.

In some embodiments the splitter bodies are arranged to conceal the flow passages from the main travel direction of the fluid flow incident towards the spinner from the first duct when the fluid intake is in use. Such concealing of the flow passages from the incident direction of the fluid flow may mean that particles following a substantially ballistic trajectory impact and bounce from the splitter bodies rather than passing through the passages into the second duct. Concealing of the flow passages may also increase the degree of convolution necessary for the fluid flow to pass through the passages and therefore may improve separation of particles tending to follow the path of the fluid flow.

In some embodiments the fluid intake further comprises a scavenge duct having an inlet from the first duct. The scavenge duct may be used to collect debris particles separated from the fluid flow.

In some embodiments the inlet is provided at a radially outer periphery of the first duct.

In some embodiments the inlet is annular. This may allow improved capture of particles regardless of their location in the incident fluid flow.

In some embodiment the inlet is axially aft of a furthest downstream splitter body. This may mean that particles are more likely to be captured by the scavenge duct regardless of which splitter body separates them.

In some embodiment, in use, flow is drawn into the scavenge duct via the inlet using a flow moving device. In this way the rate of a scavenge flow can be controlled.

In some embodiments the flow moving device is powered by the rotation of the spinner. Using the spinner to drive the flow moving device may negate the need for a separately powered pump.

In some embodiments the flow moving device comprises at least one rotor supported on the spinner and extending from a first duct side of the spinner into the first duct. The rotor(s) may be axially located adjacent the inlet to the scavenge duct. Where a plurality of the rotors are provided they may be circumferentially distributed. The rotor(s) may extract energy from rotation of the spinner to drive flow and particles into the scavenge duct.

In some embodiments the area of the first duct decreases in an area of axial alignment with the spinner. The area may decrease continuously and/or may decrease throughout the extent of its axial alignment with the spinner. Throughout the extent of its axial alignment with the spinner the first duct may be defined between the outer wall of the first duct and the spinner. The first duct may therefore define a channel towards the scavenge duct inlet with an alternative exit to the first duct being provided through the flow passages of the spinner.

In some embodiments the spinner is substantially conical. Further the apex of the spinner may be located upstream with the diameter of the spinner increasing in a downstream direction. As will be appreciated the spinner need not be exactly conical and indeed may be of a very different shape. By way of example substantially conical should be interpreted to include pseudo-conical spinners whereby the side of the cone has a concave or convex shape. Further the spinner could by way of example be cylindrical.

In some embodiments the flow passages pass from an exterior of the spinner to an interior of the spinner. By way of example, where the spinner is conical or substantially conical, the flow passages pass from an exterior of the cone (or substantially conical spinner as appropriate) to an interior of the same. The passages therefore allow the fluid flow to pass from an exterior of the spinner to an interior of the spinner before continuing along the second duct.

In some embodiments the substantially conical shape of the spinner makes the interface between the first duct and second duct oblique.

In some embodiments the splitter bodies are supported in their substantially conical arrangement at the apex. At least some of the splitter bodies may additionally or alternatively be supported at the base of the cone.

In some embodiments an outer wall of the first duct increases in radius in an area of axial alignment with the spinner. The increase in radius may be continuous. Further the outer wall of the first duct may transition into an outer wall of the scavenge duct. The transition may occur at a location substantially axially aligned with a furthest downstream splitter body.

In at least some adjacent splitter bodies a longitudinal dimension of each such body corresponding to a chord extending between leading and trailing edges of the body is canted out of parallel alignment with a surface of revolution, a generator line for the surface of revolution passing through the leading edges of each splitter body and being included in a plane also including an axis of rotation of the spinner. Further the extent of the longitudinal dimensions of at least some adjacent splitter bodies may be sufficient such that the trailing edge of each body conceals part of an adjacent body with respect to the main travel direction of the fluid flow incident towards the spinner from the first duct when the fluid intake is in use. The cant of the splitter bodies, especially when combined with sufficient longitudinal length of the bodies, may allow for the formation of the flow passages between the splitter bodies and concealment of the flow passages by the splitter bodies.

In some embodiments the leading edges of the splitter bodies are angled so as to be substantially perpendicular to a resultant gas flow vector of a particular incident gas velocity and circumferential velocity of the spinner. As will be appreciated this may mean that the leading edge angle is smoothly altered (e.g. increased) throughout the axial extent of the spinner. Specifically as the radius of the spinner increases throughout its radial extent, so the angular velocity of the splitter bodies will decrease and so the angle of the resultant gas flow vector will change. Angling of the splitter bodies in this way may mean that the force distribution exerted on the spinner by the fluid flow is better balanced across the spinner. Further, in the case of the spinner being driven by the fluid flow, by selecting the angle of the leading edges, the rate at which the spinner will rotate for a given fluid flow velocity may be selected. The minimum drag exerted by the spinner on the fluid flow may be tailored to a particular fluid flow rate that might for instance be the normal or most frequently expected fluid flow rate.

In some embodiments an outer surface of each splitter body facing the first duct and the first duct itself are angled such that a ballistic trajectory incident towards the spinner parallel to the main travel direction of the fluid flow and bouncing at one of the outer surfaces will pass into the scavenge duct.

In some embodiments the ballistic trajectory includes a bounce on the outer wall of the first duct subsequent to the bounce on one of the outer surfaces before it passes into the scavenge duct.

In some embodiments the spinner is substantially cylindrical. In such embodiments there may be provided a buffer body upstream of the spinner, the buffer body defining an annular opening of a downstream annular portion of the first duct, the downstream annular portion of the first duct being defined between the spinner and an outer wall of the first duct. In this way fluid in the fluid flow may be obliged in use to pass into the downstream annular portion of the first duct adjacent the sides of the spinner, whereupon fluid entering the second duct is obliged to pass radially inwards through the flow passages.

In some embodiments the spinner is passively driven in use by the fluid flow. Specifically drag on the splitter bodies may cause rotation of the spinner. This may be a light, inexpensive and mechanically simple solution by comparison with providing a separate drive mechanism for the spinner. Further it may mean that the rate of rotation of the spinner automatically adjusts in dependence on the mass flow through the inlet-duct.

In some embodiments one or more vanes are provided on an inner side of one or more of the splitter bodies facing the second duct. This may be particularly desirable where the spinner is used to power the flow moving device for the scavenge duct, the additional vanes increasing the power extracted by the spinner from the fluid flow. Each vane might for instance extend substantially radially from a respective splitter body into the second duct from an inner surface of the splitter body facing the second duct and from a point adjacent the leading edge of the splitter body. Further it may be that the vanes are adjustable, giving selective authority over the degree of spinner power offtake from the fluid flow. It may be for example that one, some or all vanes are rotatable about a respective radial axis, altering the angle of attack of the vane with respect to fluid flow passing into the second duct via the flow passages. In this way, where there is a relatively high threat of particle ingestion to the second duct, the power extracted and rate of spinner rotation may be increased by suitable adjustment of the vanes. If the threat of particle ingestion is subsequently reduced the vanes may be adjusted to reduce power extraction and spinner rotation rate to reduce the pressure loss across the spinner.

The spinner may also be driven by an alternative mechanism. For instance the spinner may be driven by an electric motor, by a pneumatic mechanism e.g. the jetting of air, or mechanically (e.g. via a driven shaft).

In some embodiments first duct is annular.

In some embodiments the first duct follows a substantially straight path from an inlet to the first duct to the spinner.

In some embodiments the second duct is annular.

In some embodiments a filter mesh is provided downstream of the spinner across the second duct.

In some embodiments the filter mesh is attached to a rotating spinner support structure such that the filter mesh rotates with the spinner and where further the second duct is provided with a nozzle directed at the filter mesh through which in use fluid is ejected to clean the filter mesh, the fluid cleaning different parts of the filter mesh as they rotate past the nozzle.

In some embodiments the fluid intake is the intake of a gas turbine engine. In this case the first duct may be an intake duct and the second duct may be a core duct leading to a core of the gas turbine engine. Further the spinner may rotate about the main axis of rotation of the gas turbine engine.

In particular where the fluid intake is the intake of a gas turbine engine, the splitter bodies may be provided with one or more internal anti-icing passages, through which in use air is blown having a temperature sufficient to reduce or prevent ice formation on areas of the spinner. The spinning of the spinner in use may lead to the natural distribution of the air passing through the passages.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
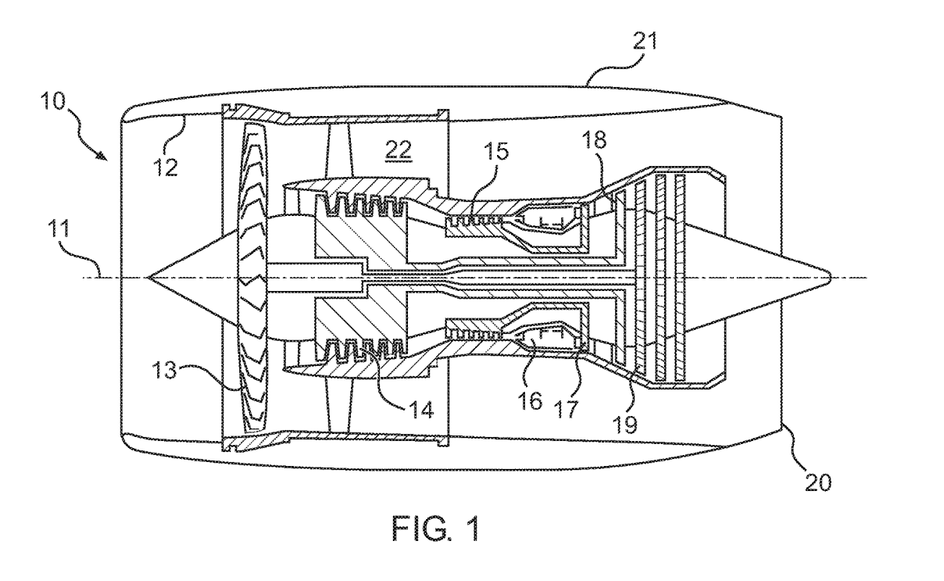
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 2:
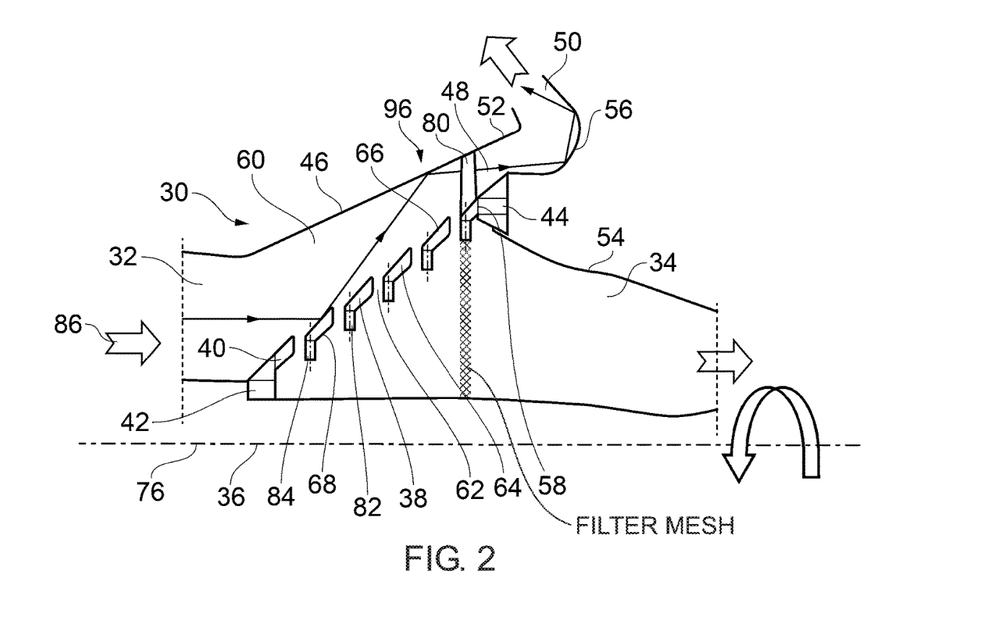
FIG. 2 is a cross-sectional view showing a gas intake in accordance with an embodiment of the invention.

Referring now to FIG. 2 a fluid intake, in this case a gas turbine engine gas intake, is generally shown at 30. The gas intake 30 has a first duct, in this case an intake duct 32, upstream of a second duct, in this case a core duct 34. Both the intake duct 32 and core duct 34 are annular, being disposed about a main rotational axis 36 of an associated gas turbine engine (not shown). The intake duct 32 follows a substantially straight path from an inlet (not shown) of the intake duct 32 to a particle separation spinner 38 provided at an interface between the intake duct 32 and core duct 34.

The spinner 38 has a substantially conical shape with an apex 40 of the cone upstream in the gas intake 30 and having a diameter that increases in a downstream direction. The substantially conical shape of the spinner 38 makes the interface between the intake duct 32 and core duct 34 oblique with respect to a main axis of both ducts 32, 34 and with respect to a main gas flow direction incident towards the spinner 38 from the intake duct 32 when the gas intake is in use. The spinner 38 is supported by the core duct 34 by an upstream bearing 42 and a downstream bearing 44.

An outer wall 46 of the intake duct 32 increases in radius in a uniform manner throughout an area of axial alignment with the spinner 38. Throughout the same region the cross-sectional area of the intake duct 32 decreases in view of the greater gradient of the spinner 38 conical surface by comparison with the increase in the intake duct 32 radius. At a downstream end of the spinner 38 the intake duct 32 has a greater radius than the core duct 34, creating an annular inlet 48 to a scavenge duct 50 of the gas intake 30 at a radially outer periphery of the intake duct 32. The outer wall 46 of the intake duct 32 transitions into an outer wall 52 of the scavenge duct 50. An outer wall 54 of the core duct 34 transitions into an inner wall 56 of the scavenge duct 50 via a knuckle 58 housing the downstream bearing 44. In the region of axial alignment with the spinner 38, the intake duct 32 defines a channel 60 towards the scavenge duct 50, there being an alternative exit from the intake duct 32 to the core duct 34 via the spinner 38 as described further below.

Figure 3:
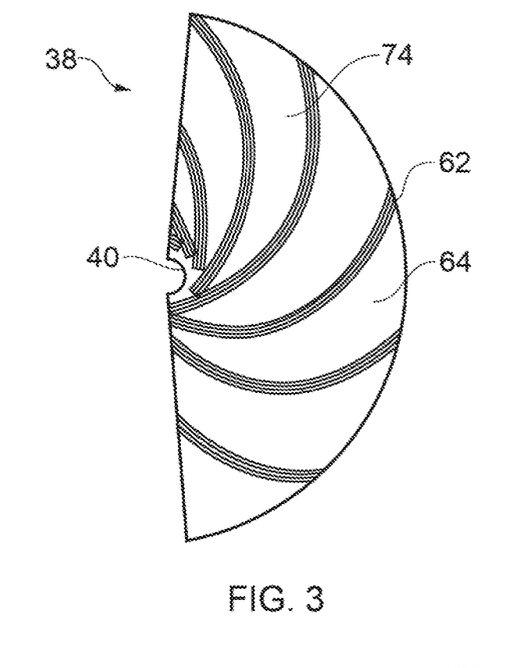
FIG. 3 is a top view showing a disassembled particle separation spinner in accordance with an embodiment of the invention.

Referring now to FIGS. 2 and 3 the spinner 38 is described in more detail. It should be noted that FIG. 3 shows a top view of the spinner 38 unwound and thus not in a configuration in which it would be used.

The spinner 38 has a plurality of flow passages 62 and a plurality of splitter bodies 64 separating the flow passages 62. Both the flow passages 62 and splitter bodies 64 are arranged in a thread like screw manner about the spinner 38. The flow passages 62 pass from an intake duct side 66 of the spinner 38 to a core duct side 68 of the spinner 38 providing a route for gas flow from the intake duct 32 to the core duct 34.

Separate flow passages 62 may be thought of as flow passages 62 divided by a splitter body 64 when the spinner 38 is viewed from any particular circumferential position. Similarly separate splitter bodies 64 may be thought of as splitter bodies 64 divided by a flow passage 62 when the spinner 38 is viewed from any particular circumferential position.

In the case of the spinner 38 of FIGS. 2 and 3 both the flow passages 62 and splitter bodies 64 are multi-start, in the sense that both the flow passages 62 and splitter bodies 64 are distributed among multiple threads. The threads of the splitter bodies 64 meet and are supported at the apex 40 of the spinner 38. As will be appreciated the multi-start arrangement might be replaced in alternative embodiments with a single start arrangement. Specifically all flow passages 62 may be provided in a single thread and similarly all splitter bodies 64 may be provided in a single thread.

Figure 4:
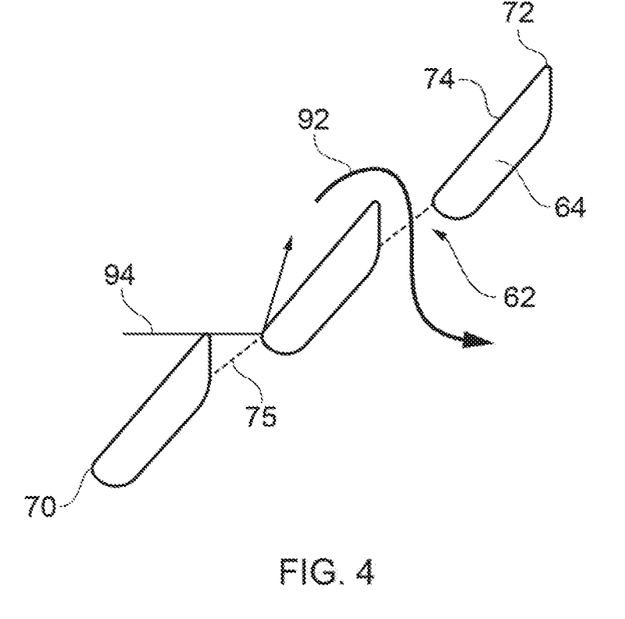
FIG. 4 is a cross-sectional view showing part of a particle separation spinner in accordance with an embodiment of the invention.
Figure 5:
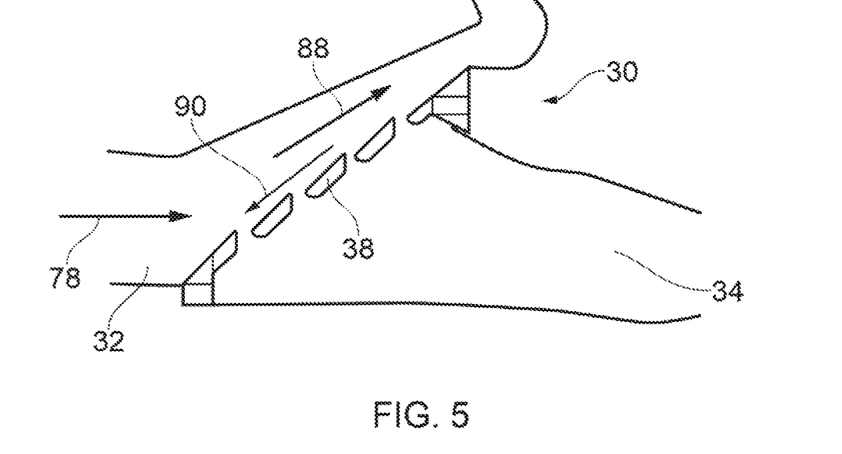
FIG. 5 is a cross-sectional view showing a gas intake in accordance with an embodiment of the invention.

Referring now to FIG. 4 a close-up cross-section of three adjacent splitter bodies 64 and two adjacent flow passages 62 is shown. Each splitter body 64 has a leading edge 70, a trailing edge 72 and an outer surface 74. A longitudinal dimension of each splitter body 64 corresponding to a chord extending between the leading 70 and trailing edges 72 is canted out of parallel alignment with a surface of revolution, a generator 75 line for the surface of revolution passing through the leading edges 70 of each of the adjacent splitter bodies 64 and being included in a plane (not shown) also including an axis of rotation 76 of the spinner 38. In other words the splitter bodies 64 extend in an off perpendicular direction away from the conical surface. Because in the embodiment of FIG. 4 the cant of each splitter body 64 is uniform, projections of circumferentially aligned chords of each splitter body 64 are parallel but do not intersect. In the embodiment of FIG. 4 the cant is such that the radius of the leading edge 70 is reduced and the radius of the trailing edge 72 is increased. Specifically The longitudinal dimension of the splitter bodies 64 is sufficient such that the trailing edge 72 of each body 64 conceals (e.g. overlaps) part of an adjacent body 64 with respect to a main travel direction 78 of gas flow incident towards the spinner 38 from the intake duct 32. The angular offset of the splitter bodies 64 with respect to an underlying conical surface therefore allows for the provision of the flow passages 62.

Referring again to FIG. 2, the spinner 38 is provided with a flow moving device, in this case a plurality of rotors 80. The rotors 80 extend radially outwards from the intake duct side 66 of the spinner 38 into the intake duct 32. The rotors 80 are located adjacent the scavenge duct inlet 48 and are circumferentially distributed about its annulus. Further the rotors 80 span the radial extent of the inlet 48.

FIG. 2 also shows a plurality of vanes 82 provided on an inner side 84 of splitter bodies 64 facing the core duct 34. Each vane 82 extends substantially radially from a respective splitter body 64 into the core duct 34 from a point adjacent the leading edge 70 of the splitter body 64. Each vane 82 is rotatable about a respective radial axis 84.

Referring now to FIGS. 1 to 5 operation of the gas intake 30 is described. In use a gas flow 86 laden with particles is ingested by an inlet to the intake duct 32. The main travel direction 78 of the gas flow 80 is incident in a downstream direction towards the spinner 38 parallel to walls of the intake duct 30. The majority of the gas flow 86 passes through the flow passages 62 and into the core duct 34 and onwards to a core of an associated gas turbine engine. A proportion of the gas flow 86 also travels via channel 60 into the scavenge duct 50 via the inlet 48 to the scavenge duct 50 as depicted by arrow 88.

As gas passes through the flow passages 62, drag created by the splitter bodies 64 causes rotation of the spinner 38 on the bearings 42, 44. Aerodynamic drag on the splitter bodies 64 will cause the rotation of the spinner 38 to accelerate until a resultant gas flow vector of the incident gas velocity and circumferential velocity of the spinner 38 is substantially perpendicular to the leading edges 70 of the splitter bodies 64. Then a circumferential force on the spinner 38 will be in equilibrium and spinning will be at a constant speed. Additional drag and therefore power extraction from the gas flow 86 is created by the vanes 82. The additional power extraction is valuable in view of the power required to rotate rotors 80, which rotate with the spinner 38 and drive particle laden gas flow into the scavenge duct 50. The vanes 82 may nonetheless be selectively feathered about respective axes 84 in order to vary the degree of additional power extracted depending on particle extraction and engine efficiency requirements.

The rotation direction of the spinner 38 is such that the flow passages 62 and splitter bodies 64 move towards the apex 40 of the spinner 38 from a static frame of reference with respect to the intake duct 32 as depicted by arrow 90. Consequently the flow passages 62 and splitter bodies 64 also have a component of movement towards the main travel direction 78 of the gas flow incident towards the spinner 38 from the intake duct 32. This component of movement increases the relative velocity between the gas flow 86 and the splitter bodies 64 and consequently the relative momentum of particles within the gas flow 86.

As gas passes through the flow passages 62, it is obliged to follow a convoluted path 92 between the trailing edge 72 and leading edge 70 of adjacent splitter bodies 64 as they travel towards the apex 40. Smaller particles, substantially entrained with the gas flow 86, with their relative momentum increased, tend to leave the gas flow as it follows the convoluted path 92, joining gas incident towards the scavenge inlet 48 along channel 60. The gas flow passing through the flow passages 62, stripped of smaller particles, then continues along the core duct 34.

Larger particles incident towards the spinner 38 are not strongly entrained in the gas flow 86, but instead tend to follow ballistic trajectories (example 94 shown), bouncing at any surfaces they intersect. In view of the overlap and consequent concealment of the flow passages 62 by their adjacent upstream splitter body 64 from the main flow direction of the gas flow 86, larger particles entering the intake duct 32 are blocked from entering the core duct 34 by the outer surfaces 74 of the splitter bodies 64. Specifically there is no clear line of sight for a ballistic trajectory from the inlet to the intake duct 32 to the core duct 34. Further the angle presented by the outer surfaces 74 of the splitter bodies 64 tends to cause larger particles incident on them to bounce towards a secondary impact zone 96 of an outer wall of the intake duct 32. The secondary impact zone 96 in turn is angled so as the larger particles then tend to bounce and travel along a trajectory taking them into the scavenge duct 50 via scavenge inlet 48.

Figure 6:
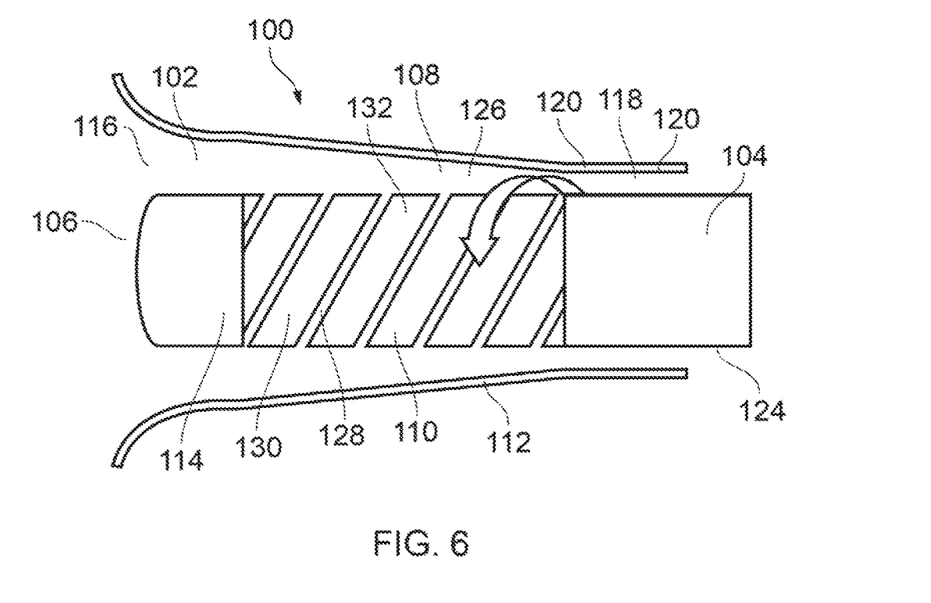
FIG. 6 is a cut-away view showing a gas intake in accordance with an embodiment of the invention.

Small and large particles in the scavenge duct 50 alike are forced out by the rotors 80 and vented to atmosphere. The rotors also control the rate of extraction via the scavenge duct 50. Referring now to FIG. 6 a fluid intake, in this case a gas turbine engine gas intake, is generally shown at 100. The intake 100 is substantially similar to the intake 30, but the spinner is cylindrical rather than conical. Differences are highlighted via further explanation of intake 100 below.

The gas intake 100 has a first duct, in this case an intake duct 102, upstream of a second duct, in this case a core duct 104. The intake duct 102 has an upstream circular portion 106 and a downstream annular portion 108. The core duct 104 is circular and has a smaller diameter than the inlet duct 102, it partially axially overlapping and being provided within the downstream annular portion 108.

A spinner 110 has a substantially cylindrical shape. An outer wall 112 of the intake duct 102 decreases in radius in a uniform manner throughout an area of axial alignment with the spinner 110. Throughout the same region the cross-sectional area of the intake duct 102 decreases, defined between the outer wall 112 and the spinner 110.

Upstream of the spinner is a substantially cylindrical buffer body 114. The buffer body 114 is coaxial with and has a similar radius to the spinner 110. The buffer body 114 supports the spinner 110 at its upstream end via a bearing (not shown). An annular opening 116 to the downstream annular portion 108 of the intake duct 102 is defined between the buffer body 114 and the outer wall 112 of the intake duct 102.

At a downstream end of the spinner 110 the intake duct 102 transitions into a scavenge duct 118. The outer wall 112 of the intake duct 102 transitions into an outer wall 120 of the scavenge duct 118 and the scavenge duct 118 is provided between the outer wall 120 and a wall 124 of the core duct 104.

In the region of axial alignment with the spinner 110, the intake duct 102 defines a channel 126 towards the scavenge duct 118 there being an alternative exit from the intake duct 102 to the core duct 104 via the spinner 110 as described further below.

Aside from its different shape the spinner 110 is similar to the spinner 38, having a plurality of flow passages 128 and a plurality of splitter bodies 130 separating the flow passages 128. As before both the flow passages 128 and splitter bodies 130 are arranged in a thread like screw manner about the spinner 110. The flow passages 128 pass from an intake duct side 132 of the spinner 110 to a core duct side (not shown) of the spinner 110 providing a route for gas flow from the intake duct 102 to the core duct 104. An interior of the spinner 110 forms part of the core duct 104.

The intake 100 functions in a similar manner to intake 30. A gas flow entering the intake 100 is obliged to follow a convoluted path if it is to enter the core duct 104 from the intake duct 102 via the passages 128. Rotation of the spinner 110 gives the flow passages 128 and splitter bodies 130 a component of movement towards a main travel direction of the gas flow incident towards the spinner 110 from the intake duct 102. This component of movement increases the relative velocity between the gas flow and the splitter bodies 130 and consequently the relative momentum of particles within the gas flow. Smaller particles, substantially entrained with the gas flow, with their relative momentum increased, tend to leave the gas flow as it follows the convoluted path into and through the flow passages 128, joining gas incident towards the scavenge duct 118. The gas flow passing through the flow passages 128, stripped of smaller particles, then continues along the core duct 104.

The arrangement of intake 100 gives less control over scavenge of larger particles than the intake 30. The intake 100 nonetheless may present a viable option (at least where removal of smaller particles is the priority).

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A fluid intake comprising:
   a first duct;
   a second duct; and
   a particle separation spinner defining an interface between the first duct and the second duct, the spinner being hollow, the first duct being on an outer side of the spinner, and the second duct being on an inner side of the spinner, the spinner comprising:
      flow passages passing from the outer side of the spinner to the inner side of the spinner; and
      splitter bodies separating the flow passages, the flow passages and the splitter bodies being arranged in a thread-like screw manner about the spinner, wherein:
   when the fluid intake is in use, the spinner is spun about an axis of rotation;
   a longitudinal dimension of each splitter body corresponds to a chord extending between a respective leading edge and a respective trailing edge of each splitter body, and is canted out of a parallel alignment with a generator line of a hypothetical surface of revolution of the spinner;
   an extent of the longitudinal dimension of each splitter body is sufficient such that the trailing edge of each splitter body conceals a part of an adjacent splitter body with respect to a main travel direction of a fluid flow incident towards the spinner from the first duct when the fluid intake is in use;
   the generator line for the surface of revolution passes through the leading edge of each splitter body and is included in a plane that includes the axis of rotation of the spinner;
   and the splitter bodies oblige fluid in the fluid flow to follow a convoluted path if the fluid is to pass from the first duct to the second duct via the flow passages.

2. The fluid intake according to claim 1, wherein the splitter bodies are arranged to conceal the flow passages from the main travel direction of the fluid flow incident towards the spinner from the first duct when the fluid intake is in use.

3. The fluid intake according to claim 1, further comprising a scavenge duct having an inlet from the first duct.

4. The fluid intake according to claim 3, wherein when the fluid intake is in use, the fluid flow is drawn into the scavenge duct via the inlet using a rotor powered by the rotation of the spinner.

5. The fluid intake according to claim 1, wherein the spinner is substantially conical.

6. The fluid intake according to claim 1, wherein the leading edges of the splitter bodies are angled so as to be substantially perpendicular to a resultant gas flow vector resulting from a particular incident gas velocity and circumferential velocity of the spinner.

7. The fluid intake according to claim 1, wherein an outer surface of each splitter body facing the first duct and the first duct itself are angled such that at least one particle in the fluid following a ballistic trajectory incident towards the spinner parallel to the main travel direction of the fluid flow and bouncing at one of the outer surfaces of the splitter bodies will pass into a scavenge duct.

8. The fluid intake according to claim 7, wherein the ballistic trajectory includes a bounce on an outer wall of the first duct subsequent to the bouncing at one of the outer surfaces of the splitter bodies, such that the at least one particle following the ballistic trajectory passes into the scavenge duct.

9. The fluid intake according to claim 1, wherein the spinner is passively driven in use by the fluid flow.

10. The fluid intake according to claim 1, wherein one or more vanes are provided on an inner side of one or more of the splitter bodies facing the second duct.

11. The fluid intake according to claim 1, wherein: a filter mesh is provided downstream of the spinner across the second duct, the filter mesh being attached to a rotating spinner support structure such that the filter mesh rotates with the spinner.

12. The fluid intake according to claim 1, wherein the fluid intake uses ambient air as a working fluid.

* * * * *